Patented Dec. 5, 1950

2,532,502

UNITED STATES PATENT OFFICE 2,532,502

DENTURES, COMPOSITIONS, AND METHODS

Homer van Beuren Joy, Montclair, N. J., assignor, by direct and mesne assignments, of one-half to Montclair Research Corporation, a corporation of New Jersey, and one-half to Ellis-Foster Company, a corporation of New Jersey No Drawing. Application February 5, 1946, Serial No. 645,713

10 Claims. (Cl. 260—45.5)

The present invention relates to dentures, to materials and compositions for producing such dentures, and to methods of making them.

The production of dentures is an exacting art. An ideal denture base material should meet the following requirements: it should be easy to manipulate; it should have sufficient strength and resilience at mouth temperatures to resist all normal masticating stresses; it should be easy to repair and should neither shrink nor expand during fabrication of the denture; it should have sufficient impact strength to resist unavoidable accident (such as dropping on the floor); it should have a relatively high thermal conductivity—in connection with which it may be noted that all resins are poor in this respect; it should be impermeable to mouth fluids and resist bacterial action and growth; it should harmonize with the soft tissues in color and translucency and should retain such properties in the mouth indefinitely; it should be tolerable to the mouth tissues and should be both odorless and tasteless; it should have a low specific gravity; and it should retain its shape whether in or out of the mouth.

Dentures have been made in the prior art from many substances but suffer from many disadvantages. Metallic dentures are strong and very sanitary, and their high thermal conductivity is advantageous in comparison to synthetic resins. But the disadvantages are that they are heavy and objectionable from an esthetic standpoint unless coated with other materials. Many of the stainless alloys are very difficult to fabricate because of their high melting point and hardness. Gold and its alloys are widely used in this country for partial dentures and stainless steel is frequently used in England.

Porcelain is satisfactory from an esthetic standpoint but it is brittle and breaks easily if accidentally dropped. It is also difficult to fabricate and its use has not been widespread. Glass dentures are likewise so difficult to fabricate that they have found little use.

Among the non-metallic materials, hard rubber also known as vulcanite or ebonite, was by far the most satisfactory over a period of many years. Its disadvantages are its lack of esthetic appeal, low thermal conductivity, lack of resistance to bacterial growth, continued shrinkage upon revulcanization, and the bulk needed to provide sufficient strength.

Various cellulose esters were placed on the market shortly after dental vulcanite was introduced but they soon fell into disuse. They are at first agreeable esthetically but they absorb water, swell, and gradually deteriorate. The plasticizers wash out and the color changes to a dirty brown.

Phenol formaldehyde resins have been used in this country but they soon become discolored. Styrene resins have been unsatisfactory because of excessive brittleness. The alkyd resins which have been tested for dental use cured too slowly. Urea resins have been suggested for dental use but their water-resistance is poor.

These considerations show that the production of a satisfactory dental resin is a matter of great difficulty.

At the present time, two resins are used in a great majority of cases. Methyl methacrylate polymer plasticized with monomeric liquid has been very satisfactory in most respects. Its color stability is excellent and its mechanical properties are good. The best known brands are "Lucitone" and "Vernonite." A vinyl chloride-acetate resin plasticized by monomeric methyl methacrylate, "Luxene 44," has also been reasonably satisfactory. Its color stability is good although considerably inferior to the methacrylates but its impact strength is extremely high and its water absorption is very low.

The reason that these resins must be plasticized is that dentists and most dental laboratories want to use cheap, simple equipment which can be operated by hand. Most dentures are molded in a "dental flask." This flask consists of two metallic frames which are filled with plaster and which are pressed together by a hand operated screw clamp. The plaster in the mold pieces is hollowed out to form a mold. This is a very flexible arrangement because the plaster can be adjusted to mold dentures for jaws of various sizes and shapes. Curing usually is effected by placing the flask in boiling water. In order to avoid blanching, resinous materials must be protected from water by lining the plaster mold usually with tin foil. The pressure employed obviously is low.

Permanent plasticizers have not been acceptable for dental use because they decrease the rigidity and hardness. This difficulty was overcome by the use of monomeric methyl methacrylate which soon cures to a hard resin. No other curable plasticizers have been used much commercially except to the extent that a small percentage of monomeric styrene is sometimes mixed with the monomeric methacrylate for use with vinyl resins. Acrylates and methacrylic esters of monohydric alcohols higher than the methyl, give compositions which are too soft and which have inferior rigidity.

Monomeric methyl methacrylate, however, possesses a number of disadvantages. It boils at 100° C. and the polymerization is very exothermic so that the liquid is likely to boil and form bubbles in the denture. In order to reduce the likelihood of bubble formation, present practice is to start the cure at 50-80° C. for 1 hour and then raise the temperature to 100° C. This is somewhat inconvenient and even with this precaution, bubbles are frequently formed. Bubbles are objectionable because they reduce the strength of the denture and may roughen the surface, which is irritating to the mouth tissues.

Methyl methacrylate dental materials are generally used in three forms: (1) separate containers of polymeric granules and liquid are supplied. This is by far the most widely used form, for the liquid which contains a little inhibitor is usable for about one year without refrigeration. The disadvantage is that the dentist has to mix the materials to form a "putty" immediately before the denture is molded. This takes considerable time and trouble and a dentist may fail to mix the ingredients properly and get poor results.

(2) Methyl methacrylate is also sold in the form of a plastic cake or sheet. The catalyst, monomer and polymer, are mixed on rolls. The plastic cake is said to be stable for 6 months if stored in a refrigerator at below 55° F. At room temperature the life is very short. The sale of such cake material is small as compared to the powder-liquid form because dealers do not like to bother with refrigerators.

(3) A very small amount of dental molding is done with unplasticized polymeric methyl methacrylate but this has never been popular because of the difficulty of fabrication and the high temperature required.

Among the objects of the present invention is the production of dentures free from difficulties experienced in utilizing prior art materials.

Further objects include compositions and materials utilizable for the production of such dentures and methods of producing dentures from such materials.

Still further objects and advantages of the present invention will appear from the more detailed description set forth below, it being understood that such more detailed description is given by way of illustration and explanation only, and not by way of limitation, since various changes therein may be made by those skilled in the art, without departing from the scope and spirit of the present invention.

In accordance with the present invention it has been found that the acrylic and methacrylic di-esters of certain polyhydric alcohols, particularly dihydric alcohols, have a number of important advantages for utilization in dentures produced from denture resins plastic'zed with the stated esters. These plasticizers utilized in accordance with the present invention may be described as dimethacrylates of a glycol having the formula $C_xH_yO_2$, where $x$ is from 2 to 4, and $y$ is an even number from 6 to 10, or a di-acrylate of a glycol having the formula $C_xH_yO_2$, where $x$ is from 2 to 3, and $y$ is an even number from 6 to 8, and also glycerol trimethacrylate. As exemplary of such materials that may be employed there may be mentioned the di-esters of ethylene glycol, trimethylene glycol (1.3 propane diol), propylene dimethacrylate produced from propylene glycol (1.2 propane diol), and the methacrylic esters of the various butylene glycols. Ethylene acrylate may also be used as well as propylene acrylates.

Most resins when plasticized with the polyhydric alcohol esters referred to above, cure to materials having low impact strength. Two resins which have been found of outstanding value in the production of dentures in accordance with the present invention utilizing the plasticizers set forth above, are as follows: "VYNS," Union Carbide Corporation, a vinyl chloride-acetate copolymer containing 88.5-90.5% of vinyl chloride and having an average molecular weight of about 16,000 as determined by the Staudinger viscosity method; and "Butacite VF7100" flake, E. I. du Pont de Nemours Company, a polyvinyl butyral resin, showing a viscosity in 5% solution in ethanol at 25° of 65-85 centipoises, substantially insoluble in methanol. The term "denture resin" is used herein to mean resins which yield dentures having properties of impact strength, Rockwell hardness, water absorption, rigidity, shrinkage, and water solubility obtainable by the two resins specifically set forth immediately above.

For utilization it is best to treat these commercial resins by special washing in order to give compositions with a solubility low enough to pass the A. D. A. test (0.1% maximum). Such washing may be carried out by agitating the resins for several hours with water, preferably distilled or deionized water. After filtration, the resins are dried to constant weight (usually at 60° C. in an oven with a blower).

Desirably the resins referred to above are utilized in combination, both the "VYNS" and "Butacite VF7100" being present together with one or more of the plasticizing esters referred to above. Proportions may be varied within the limits where usable compositions for denture purposes are obtained, proportions for other purposes, of course, varying more widely. Thus for denture use where mixtures of the solid resins are employed, the plasticizing liquid may be used in proportions of from about or somewhat less than 50 parts to approximately or even more than 70 parts to 100 parts of the solid resins. In such mixed resin compositions, the "Butacite" component may vary from about 15 to about 70 parts to 85 to 30 parts of the "VYNS." The "Butacite" material may be used by itself and exhibits excellent impact strength and is satisfactory in all respects when plasticized with plasticizers produced in accordance with the present invention, but is not as satisfactory with respect to water absorption.

"VYNS" resin may be used without "Butacite," desirably increasing the proportion of the liquid plasticizer. Thus, for example, 12 parts of "VYNS" may be used with from 9 to 12 parts of the plasticizing liquid and bars produced therefrom with high impact strength. As the proportion of liquid increases, the mixture becomes softer, and the amount of liquid should not be sufficient to make the material so soft as to be sticky when used for denture purposes since it is handled with the fingers when it is packed around the porcelain teeth prior to curing.

Among advantages which may be noted in the utilization of plasticizers of the character described above in the production of dentures, it may be stated that these plasticizing liquids of the present invention have high boiling points, and bubbles are never formed in the production of dentures. The dental flask may be placed in boiling water without any prior gradual heating when the glycol methacrylates are used. The glycol acrylates desirably should be used with lower initial temperatures. Utilization of these materials is exemplified in examples given below.

Materials produced in accordance with the present invention may advantageously be employed in the form of ready-mixed, plastic cake or sheet material. It has excellent shelf life without requiring the use of refrigeration. Samples stored more than 4 months at room temperature show little or no change. Since the monomers of plasticizing liquids referred to, have a high boiling point, an airtight seal is not required to prevent evaporation. This desirable property is important as shown by comparison with the methyl methacrylate cake since a package of the latter if opened and left exposed to the air for even a few hours, becomes too hard for use.

An additional advantage of materials produced in accordance with the present invention over the use of methyl methacrylate is that shrinkage during the cure is less. When the resins are cured over a metal form which looks somewhat like an opera hat, material produced in accordance with the present invention fits well, but the methyl methacrylate shrinks enough so that the fit is visibly poor and the resin can be made to wobble on the form. Methyl methacrylate, over a period of several weeks, absorbs enough water from the mouth to compensate for the cure shrinkage but the initial bad fit which occurs while the gums are still tender from the extraction of the teeth, is highly objectionable. Comparative tests for shrinkage with the methyl methacrylate material gave .40% as compared with .28% for materials produced in accordance with the present invention.

As shown in the table of properties given below, materials produced in accordance with the present invention have higher transverse strength and rigidity than any of the resinous materials now in commercial use. It adheres well to gold, is easily repaired, and has been cast into dentures and worn in many different mouths for substantial periods of time with entire satisfaction. The rigidity is extraordinary, and the abrasion resistance is much higher than that of the other materials. It is easy to fabricate and does not tend to crack porcelain teeth during cure (a serious difficulty encountered with methyl methacrylate, partially overcome by painting the teeth with a polymerization retarder).

The following examples illustrate the invention, the parts being by weight unless otherwise indicated.

Example 1

|   | G. |
|---|---|
| "VYNS" | [1]75. |
| "Butacite VF7100" flake | [1]25 |
| Ethylene methacrylate | 50 |
| Benzoyl peroxide | 0.5 |

[1] Washed as previously described.

The peroxide was dissolved in the liquid and the liquid was then mixed with the resins in a mortar. After about one-half hour, the material was mixed on a rubber mill with cool rolls until substantially homogeneous. The sheet or cake is preferably about ¼ inch thick. It is then molded in a dental flask at 100° C. for about 1½ hours. In the following table its properties are compared to those of other commercial resins. A, B, and C are methacrylates from different companies, and D is a vinyl resin plasticized with methyl methacrylate, and E is the resin of Example 1. The hardness values in all the examples were read on the B scale of a Rockwell tester using a ¼" ball and a 100 kg. weight. The rigidity of this material is extremely high and would probably have reached about 300° F. if the test had been continued until a 0.1 inch deflection was attained.

The benzoyl peroxide in this example may be replaced by other organic peroxides which are soluble in the plasticizer such as 0.5 g. of lauroyl peroxide. Acetyl peroxide or tertiary butyl hydroperoxide may also be employed.

*Physical properties of denture materials*

| Material | Rigidity | | Cm. kg./cm.² Impact | Rockwell Hardness | Shrinkage | Mg./cm.² Water Sorption | Mg./cm.² Solubility |
|---|---|---|---|---|---|---|---|
|  | .01 | .10 in. |  |  |  |  |  |
|  | °F. | °F. |  |  |  |  |  |
| A | 170 | 225 | 10.0 | 100 | 8.00 | 0.60 | 0.03 |
| B | 205 | 235 | 10.6 | 102 | 7.80 | 0.55 | 0.03 |
| C | 194 | 226 | 10.4 | 100 |  | 0.55 | 0.03 |
| D | 170 | 192 | 18.0 | 78 | 8.2 | 0.20 | 0.02 |
| E | 196 | *254 | 13.0 | 95 | 7.75 | 0.29 | 0.06 |

*.05 in.

*Transverse strength*

| Material[1] | 2000 Gm. | 3000 Gm. | 4000 Gm. | 5000 Gm. | 6000 Gm. | 7000 Gm. | 8000 Gm. | Maximum Load |
|---|---|---|---|---|---|---|---|---|
|  | Mm. |  |  |  |  |  |  |  |
| A | .48 | 1.15 | 2.66 | 4.18 | 7.09 |  |  | 6,500 |
| B | .38 | 1.20 | 2.14 | 3.22 | 4.63 |  |  | 6,500 |
| C | .47 | 1.48 | 2.63 | 4.36 |  |  |  | 6,100 |
| D | .38 | 1.22 | 2.20 | 3.33 | 5.10 |  |  | 7,000 |
| E | .33 | 1.12 | 1.91 | 2.77 | 3.84 | 5.37 | 11.42 | 8,000 |
| E | .34 | 1.20 | 2.02 | 2.98 | 4.22 | 6.35 | 17.00 | 7,722 |
| E | .38 | 1.18 | 2.00 | 2.90 | 3.86 | 6.28 | 13.43 | 7,735 |
| E | .38 | 1.14 | 1.92 | 2.78 | 4.14 | 6.56 | 13.47 | 7,581 |
| E, Average | .36 | 1.16 | 1.96 | 2.86 | 4.02 | 6.14 | 13.83 | 7,760 |

[1] Stored 2 days—wet—37° C.

Example 2

The cake of Example 1 was pigmented with 0.15 g. of a pigment having the following composition:

|   | Parts |
|---|---|
| Cadmium red, light color | 12 |
| Cadmium red, medium color | 16 |
| Cadmium red, deep color | 32 |
| Titanium dioxide | 240 |

Dentures with this pigment or with slight variations in shade have been worn over substantial periods with entire satisfaction. Stabilizers for vinyl resins such as 1% or more of calcium stearate or of basic lead carbonate may be added if desired but they are not needed provided the resin is not cured at a temperature above 100° C. Antioxidants such as .006% of hydroquinone which in some cases may increase the shelf life and does not interfere with the cure may be included.

*Example 3*

The resin of Example 1 pigmented with about .06 to 0.10 g. of a pigment having the same reds as the pigment of Example 2 but with the titanium dioxide replaced by an equal weight of aluminum hydroxide or preferably a hydrated alumina known as "C-741" (Aluminum Company of America) which is an alumina coated with stearic acid to assist in milling. The resin may also be pigmented with 0.23 g. of the above pigment and 5 g. of "C-741" which gives a desirable color. The use of an aluminum pigment is advantageous because when a relatively translucent pigment like alumina is used, it is helpful in matching the translucency of the mouth tissues.

*Example 4*

| | G. |
|---|---|
| "VYNS" | 50 |
| "Butacite VF7100," flake | 50 |
| Ethylene methacrylate | 50 |
| Benzoyl peroxide | 0.5 |

The impact strength of the cured resin was 10.75 cm.kg./cm.$^2$. Rockwell hardness 92. Water absorption 0.45 mg./cm.$^2$, maximum load in the transverse strength test 7000 g. The water absorption of this resin is considerably greater than that of the resin of Example 1, but it is less than that of the methacrylates as shown in the table of examples.

*Example 5*

| | G. |
|---|---|
| "VYNS" | ¹ 75 |
| "Butacite VF7100," flake | ¹ 25 |
| Trimethylene methacrylate | 50 |
| Benzoyl peroxide | 0.5 |

Cured 1½ hours at 100° C.

¹ Washed as previously described.

Impact 14 cm.kg./cm.$^2$. Rigidity .01 inch at 188°–.05 in. at 232° F. Rockwell hardness 89. Water absorption .53 mg./cm.$^2$. Maximum load 7350 g.

*Example 6*

| | G. |
|---|---|
| "VYNS" | 75 |
| "Butacite VF7100," flake | 25 |
| Propylene methacrylate | 50 |
| Benzoyl peroxide | 0.5 |

Impact 7.5 cm.kg./cm.$^2$. Rigidity .01"–183° and .05 inch at 230° F. Rockwell hardness 87. Maximum load 6340 g. This is an example of the use of a glycol ester made from a glycol having a secondary hydroxy group.

*Example 7*

| | G. |
|---|---|
| "VYNS" | 12 |
| Ethylene methacrylate | 12 |
| Benzoyl peroxide | 0.06 |

Unlike the "Butacite" containing resins, this resin was clear. The water absorption, impact strength, and hardness are satisfactory.

*Example 8*

| | G. |
|---|---|
| "VYNS" | 75 |
| "Butacite VF7100," flake | 25 |
| Ethylene methacrylate | 70 |
| Benzoyl peroxide | 0.5 |

Rockwell hardness 96. Impact strength 7.3 cm.kg./cm.$^2$.

*Example 9*

| | G. |
|---|---|
| "VYNS" | 75 |
| "Butacite VF7100," flake | 25 |
| Ethylene acrylate | 50 |
| Benzoyl peroxide | 0.5 |

The cake was softer than the cakes prepared with methacrylates of glycols, and its shelf life was not nearly as good. When an attempt was made to cure at 100° C., there was considerable blackening due to the excessively rapid exothermic polymerization. By curing about 2½ hours or less at 50° C. and then raising the temperature to 100° C., good products were cast. The average impact strength of three specimens was 13 cm.kg./cm.$^2$, and the Rockwell hardness values were around 70. Obviously this material is greatly inferior to the glycol methacrylate cakes but it is usable.

Having thus set forth my invention, I claim:

1. A denture of a denture resin plasticized with a plasticizer selected from the group consisting of a dimethacrylate of a saturated straight chain glycol having the formula $C_xH_yO_2$, where $x$ is 2 to 4, and $y$ is an even number from 6 to 10, a diacrylate of a saturated straight chain glycol having the formula $C_xH_yO_2$, where $x$ is 2 to 3, and $y$ is an even number from 6 to 8, and glycerol trimethacrylate, in which the denture resin includes vinyl chloride-acetate copolymer denture resin and polyvinyl butyral denture resin in which the ratio of resins is from 85:15 to 30:70, and the ratio of resins to plasticizer is 100 to from approximately 50 to 70, the stated ratios being in parts by weight.

2. A denture of a denture resin of 75 parts of a vinyl chloride-acetate copolymer containing 88.5–90.5% vinyl chloride and having an average molecular weight of about 16,000, 25 parts of a polyvinyl butyral resin showing a viscosity in 5% solution in ethanol at 25° C. of 65–85 centipoises, and substantially insoluble in methanol, and 50 parts trimethylene methacrylate, the parts being by weight.

3. A denture of a denture resin of 75 parts of a vinyl chloride-acetate copolymer denture resin, 25 parts of a polyvinyl butyral denture resin, and 50 parts of trimethylene methacrylate, the parts being by weight.

4. A denture of a denture resin of 75 parts of a vinyl chloride-acetate copolymer denture resin, 25 parts of a polyvinyl butyral denture resin, and 50 parts of ethylene methacrylate, the parts being by weight.

5. A denture of a denture resin of 75 parts of a vinyl chloride-acetate copolymer denture resin, 25 parts of a polyvinyl butyral denture resin, and 50 parts of tetramethylene methacrylate, the parts being by weight.

6. The denture of claim 1 in which the plasticizer is glycerol methacrylate.

7. The denture of claim 1 in which the plasticizer is ethylene methacrylate.

8. The denture of claim 1 in which the plasticizer is trimethylene methacrylate.

9. The denture of claim 1 in which the plasticizer is tetramethylene methacrylate.

10. The denture of claim 1 in which the plasticizer is ethylene acrylate.

HOMER van BEUREN JOY.

REFERENCES CITED

The following references are of record in the file of this patent:

UNITED STATES PATENTS

| Number | Name | Date |
|---|---|---|
| 2,101,107 | Strain | Dec. 7, 1937 |
| 2,155,590 | Garvey | Apr. 25, 1939 |
| 2,326,543 | Macht | Aug. 10, 1943 |
| 2,369,057 | Leary | Feb. 6, 1945 |

FOREIGN PATENTS

| Number | Country | Date |
|---|---|---|
| 484,343 | Great Britain | May 4, 1938 |
| 497,179 | Great Britain | Dec. 14, 1938 |
| 540,383 | Great Britain | Oct. 15, 1941 |